Oct. 28, 1958   J. LERNER ET AL   2,857,928
APPARATUS FOR MEASURING RESPONSE TIME OF CONTROL SYSTEMS
Filed Dec. 27, 1957   2 Sheets-Sheet 1

INVENTORS
JULIUS LERNER &
ROBERT LIVESAY
BY
ATTORNEYS

Oct. 28, 1958        J. LERNER ET AL        2,857,928

APPARATUS FOR MEASURING RESPONSE TIME OF CONTROL SYSTEMS

Filed Dec. 27, 1957                        2 Sheets—Sheet 2

INVENTORS
JULIUS LERNER &
ROBERT LIVESAY
BY
ATTORNEYS

United States Patent Office 2,857,928
Patented Oct. 28, 1958

2,857,928

APPARATUS FOR MEASURING RESPONSE TIME OF CONTROL SYSTEMS

Julius Lerner, Drexel Hill, Pa., and Robert H. Livesay, Wilmington, Del., assignors to Sun Oil Company, Philadelphia, Pa., a corporation of New Jersey Application December 27, 1957, Serial No. 705,682

9 Claims. (Cl. 137—551)

This invention relates to apparatus for measuring response time of control systems.

In the design and operation of equipment to be used in a process, it is beneficial to know the response time or time lag of a control, in other words, how long it takes for an effect to follow a cause. This information, if known, helps in placing the optimum control for a process at the optimum place therein.

In securing the foregoing result it is desirable to have the process operating substantially normally. In accordance with the present invention this result is achieved by providing modulation of a control to secure corresponding and recognizable modulation of an effect of interest. Desirably, this modulation is sinusoidal so that the time lag will appear as a phase shift of the sinusoidal wave. Desirably, in accordance with the invention, the modulating wave and the wave appearing as its effect are concurrently recorded to facilitate determination of the lag. The period of the modulation is desirably adjustable through a very wide range so that the apparatus is capable of being used in many types of processes and in parts where the lags may have a very wide range.

The objects of the invention relating to the accomplishment of the foregoing ends, and other objects of the invention relating to details of construction and apparatus will become apparent from the following description, read in conjunction with the accompanying drawings, in which.

The specific embodiment of the invention which will be described involves interconnected electrical and pneumatic elements, but, as will become apparent, the various interconnected elements may well be replaced by electrical, mechanical, pneumatic or hydraulic equivalents. The choices of these will depend largely on the process involved. Suitable transducers may be used depending upon specific controls and specific variables which are to be sensed.

Figure 1:
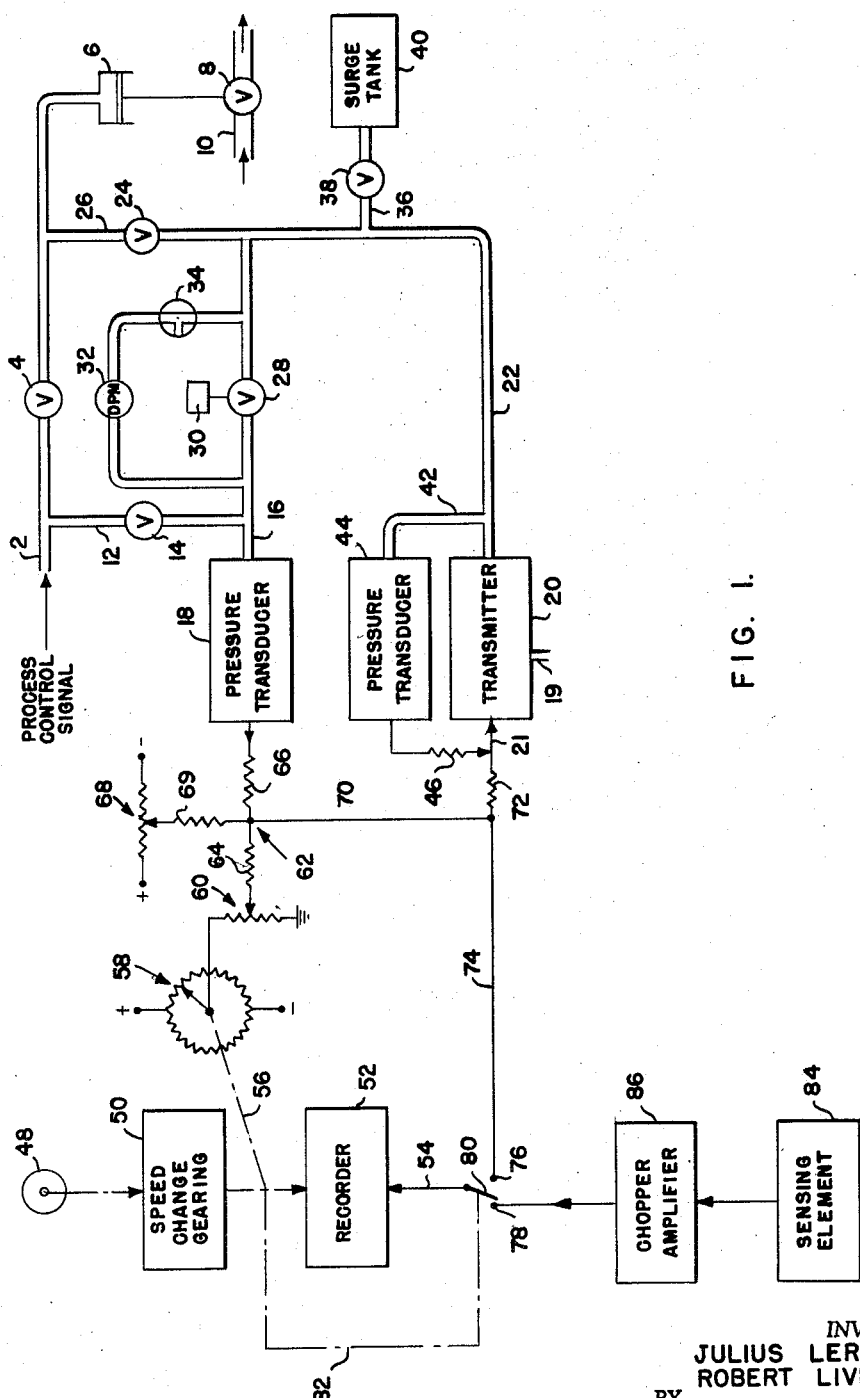
Figure 1 is a block diagram showing mechanical, electrical and pneumatic connections which may be provided in accordance with the invention.

Figure 1 shows a typical embodiment of the invention which is specifically applied to the control of a fluid with sensing of a variable such as temperature, pressure, velocity, level, or the like. A process control signal, provided, for example, by air pressure, is introduced at 2 through a line having a control valve 4 to the operator 6 of a valve 8 which controls process fluid in a line 10. This process fluid could be of any desired type, but might, for purposes of illustration, be considered to be steam for applying heat to a process. In such case, the effect to be measured might typically be a temperature.

In the ordinary operation of the process the valve 4 would be open to effect the usual control. In accordance with the present invention, during the making of a lag measurement the valve 4 is closed and the control is effected indirectly. For this purpose, on the supply side of the valve 4 there is a connection 12 controlled by a valve 14 and arranged to supply through connection 16 the process control signal to a pressure transducer 18 converting pressure into a proportional electrical signal. Such pressure transducers are well known in the control arts and consequently the transducer need not be described in detail.

At 20 there is indicated a transmitter which receives a supply of air at 19 and an electrical signal at 21 to supply through its outlet connection 22 a pressure which is proportional to its electrical input signal. Such a transmitter is also a well known device in the control arts and may take various forms in well known fashions. In general, it will involve an electrical amplifier and a suitable transducer to provide the output pressure in proportion to the input electrical signal. The pressure provided by this transmitter is delivered to the valve operator 6 through connection 26 controlled by a valve 24. In order to avoid interruption of the process in the event of electrical failure, a valve 28 is desirably provided to bypass the system of the present invention, this valve being of a normally open type held closed by the action of a solenoid 30 so that in case of electrical power failure the valve provides a direct connection between the process control signal supply at 2 and the valve operator 6. Shunted across this valve 28 is a differential pressure meter 32 which may be read by an operator to check the extent of unbalance which is involved during lag measurement. A three-way valve 34 is desirably provided either to form the normal connection illustrated in Figure 1 or to open the right hand side of the meter to the atmosphere for calibration purposes.

During calibration it may also be desirable to connect the pneumatic system through connection 36 and valve 38 to a surge tank 40.

To reduce the output impedance of the transmitter 20 a feedback is desirably provided including the pneumatic connection 42, the pressure transducer 44 and the electrical output arrangement 46. The transducer 44 is similar to that shown at 18, to provide a feedback electrical system in response to pressure changes.

A constant speed motor 48 drives through speed change gearing 50 an electrical recorder 52. This recorder receives its electrical input at 54. The speed change gearing also desirably drives through mechanical connection 56 the rotating arm of a potentiometer 58 which supplies to a voltage-dividing potentiometer 60 a sinusoidal electrical wave. The speed change gearing 50 desirably has a wide range of change so as typically to provide a sinusoidal wave the period of which may vary from one cycle per hour to one-thousand cycles per hour. This range will generally suffice for most purposes but it will be apparent that through additional gearing the range may be still further extended.

The adjustable voltage divider 60 provides a sinusoidal signal of desired amplitude to an adding system the output of which is taken from point 62. To provide adding the potentiometer 60 is connected to point 62 through a resistor 64, and the electrical signal from pressure transducer 18 is delivered to point 62 through a resistor 66. A potentiometer 68 may also provide a level-adjusting electrical input through a resistor 69. The output from the adder at 62 is delivered through connection 70 and resistor 72 to the input 21 of the transmitter 20. It is also delivered through connection 74 to one of the fixed contact points 76 of a single-pole double-throw switch 80, the other fixed contact point of which is shown at 78.

A sensing element is shown at 84 and may take the form of any transducer arranged to transform the effect to be measured into an electrical signal. If temperature is the effect to be measured, the sensing element is a suitable temperature responsive transducer; for pressure it would be a pressure transducer; for other effects such as level, velocity, or the like, it would be correspondingly chosen. The electrical output of such a sensing element is generally small and consequently it is desirably amplified by a chopper amplifier 86 of conventional type for delivery of the output signal to the contact point 78. The switch 80 is desirably operated between the contact points 76 and 78 through mechanical connection 82 from the change speed gearing 50, the arrangement being such as to provide switching a suitable number of times during each cycle of the potentiometer 58 thereby to provide on a common record in the recorder 52 records of both potentials appearing at contact points 76 and 78.

Figure 2:
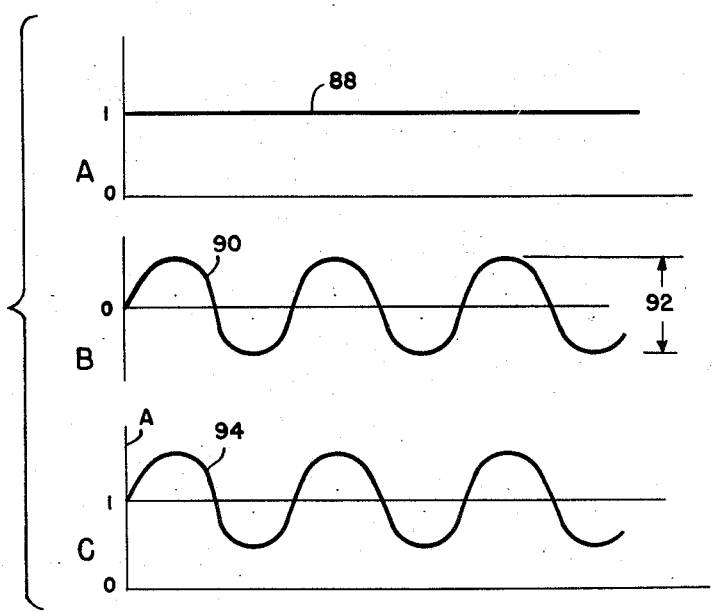
Figure 2 shows graphs explanatory of the operation of the system.
Figure 3:
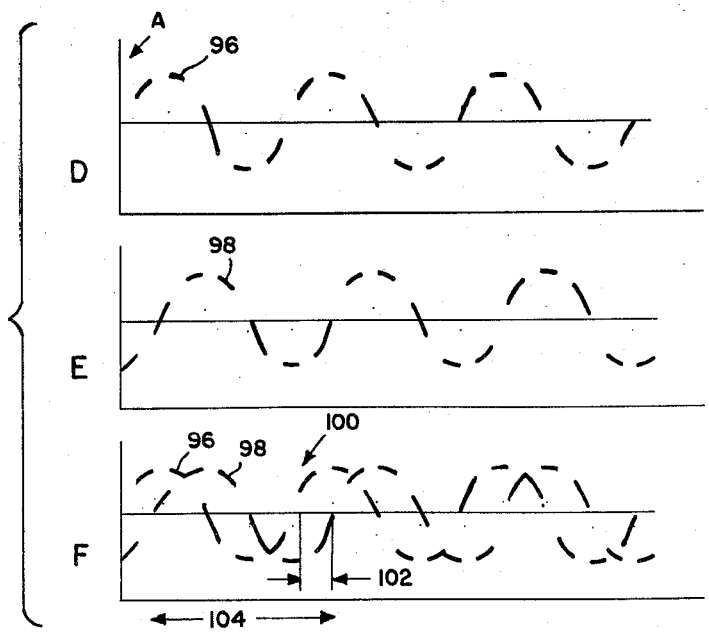
Figure 3 is a further diagram similar to that of Figure 2.

In the operation of determining time lag, the valve 4 is closed and the valves 14 and 24 opened. If no signal was delivered from the potentiometer 60, the control of the process would be normal except for the fact that it would take place indirectly. Through connection 16 the pressure at 2 would be applied to transducer 18 providing an electrical signal to the adding circuit which by delivery at 21 to the transmitter 20 and the operation of this transmitter would become a pneumatic signal applied through connections 22 and 26 to the valve operator 6. To secure the same normal control, the level adjustment provided by potentiometer 68 may be used. The meter 32 will indicate under such conditions the desired equality between the pressures at 2 and at the operator 6. The recorder 52 will also effect an electrical measurement of the pressure. When it is desired to measure the lag in the system, a suitable sinusoidal wave is fed to the adder to be superimposed additively on the output from the transducer 18, the amplitude of this wave being adjusted at 60. Under these circumstances the transmitter 20 will be controlled to control in turn the valve operator 6 in a fashion which amounts to superimposing on the normal control signal thereto a sinusoidal deviation. The result will then be a sinusoidal variation of the effect picked up by the sensing element 84. The amplitude of the sinusoidal variation may be chosen so as not to affect the process to an undue extent, and the meter 32 will furnish an observable measure of the extent of the sinusoidal deviation. By reason of the switching action at switch 80 the potentials appearing at 76 and 78 will be alternately applied to the recorder so that it will record alternately the two potentials in the form of two "dotted" curves. Reference may now be made to Figures 2 and 3 which indicate the operations just described in graphical form. The process control signal applied to the adder 62 through resistor 66 is shown at A as involving a curve 88 which under many circumstances will be substantially constant, i. e., a straight line. At B there is indicated at 90 the sinusoidal signal from the sine wave generator 58 which is delivered through the resistor 64. The sum of these two signals is indicated at C at 94 which represents the output from the adder through connection 70.

The part of the record delivered from the adder 70 through connection 74 and switch 80 is indicated in curve D at 96, this record being chopped by the action of the switch 80. Similarly, the record shown at E at 98 is the signal delivered from the sensing element through the amplifier 86 which appears as a curve also chopped by the switch 80. The actual combined record is indicated at F, this record being that drawn by the pen or other marking device of the recorder 52. It will be noted that the actual portions of curves 96 and 98 which are recorded alternate to give the combined record 100. As will be seen from graph F, the time lag is directly measureable by the phase difference 102 between the two sinusoidal recorded waves. A full wavelength is indicated at 104, and the time lag measured in time units will then be the ratio of 102 to 104 multiplied by the known time periods of the wave as determined from a knowledge of the cycle period from the known motor speed 48 and the speed change ratio which is used.

It will be evident from the foregoing that the lag measurement may be made under normal operating conditions merely by the superposition of a sinusoidal variation on the control which may be chosen of such amplitude as not to adversely affect the process but sufficient only to secure an observable sinusoidal change in the effect produced at the sensing element. By providing suitable valving and connections the apparatus may be located at various points of any desired number of processes. From the ascertained lags conclusions may be drawn as to proper types and placements of controls to secure optimum control functions.

While in the foregoing the signal picked up by the sensing element 84 has been conventionalized as a sine wave, it will be understood that in a nonlinear system the waveform would be distorted but would be periodic, having the frequency of the original wave. Despite this, phase shift will be evident and measurable, the waveform being immaterial. In fact, there is no need for the input provided from the source 58 to be sinusoidal, since any periodic waveform may be used, e. g. a rectangular wave, or the like.

It will be evident from the foregoing that numerous substitutions for the individual elements of the system may be made, mechanical, pneumatic, hydraulic or electrical equivalents being substitutable, without departing from the invention as defined in the following claims.

What is claimed is:

1. In combination with a control system including means providing a process control signal, a process control means, and a sensing element providing a signal in response to operation of said control means, apparatus for measuring delay between operation of said control means and the provision of a signal by said sensing element, said apparatus comprising means providing a predetermined variable signal, means for recording the last mentioned signal, means for applying to said process control means a controlling signal therefor comprising the sum of said process control signal and said variable signal, and means for recording the signal provided by said sensing element in response to the resulting operation of said control means.

2. In combination with a control system including means providing a process control signal, a process control means, and a sensing element providing a signal in response to operation of said control means, apparatus for measuring delay between operation of said control means and the provision of a signal by said sensing element, said apparatus comprising means providing a predetermined periodic variable signal, means for recording the last mentioned signal, means for applying to said process control means a controlling signal therefore comprising the sum of said process control signal and said variable signal, and means for recording the signal provided by said sensing element in response to the resulting operation of said control means.

3. In combination with a control system including means providing a process control signal, a process control means, and a sensing element providing a signal in response to operation of said control means, apparatus for measuring delay between operation of said control means and the provision of a signal by said sensing element, said apparatus comprising means providing a predetermined sinusoidal variable signal, means for recording the last mentioned signal, means for applying to said process control means a controlling signal therefor comprising the sum of said process control signal and said variable signal, and means for recording the signal provided by said sensing element in response to the resulting operation of said control means.

4. The combination according to claim 2 in which both of said recording means record their signals concurrently on a single chart so that the phase relationship of their signals may be determined.

5. The combination according to claim 3 in which both of said recording means record their signals concurrently on a single chart so that the phase relationship of their signals may be determined.

6. The combination according to claim 2 including means for changing the frequency of said periodic variable signal.

7. The combination according to claim 3 including means for changing the frequency of said sinusoidal variable signal.

8. The combination according to claim 1 provided with means for alternatively effecting control of said control means directly by said process control signal.

9. The combination according to claim 1 including means for adjusting the amplitude of said predetermined variable signal.

No references cited.